Oct. 25, 1966  J. DAUBENFELD  3,281,192
THRUST-BEARING
Filed March 16, 1964

INVENTOR.
JEAN DAUBENFELD
BY
Edwin Levisohn and Henry R. Lerner
ATTORNEYS.

United States Patent Office 3,281,192
Patented Oct. 25, 1966

3,281,192
THRUST-BEARING
Jean Daubenfeld, Luxembourg, Germany, assignor to Zimmermann & Jansen G.m.b.H., Duren, Rhineland, Germany
Filed Mar. 16, 1964, Ser. No. 352,720
1 Claim. (Cl. 308—219)

This invention relates to improvements in thrust-bearings, and particularly to a thrust-bearing for reaction against great axial forces acting upon relatively small diameter shafts.

In the extruder art, and especially with double extruders, the distance between the two spindles of the extruder is small. However, the axial thrust forces which must be observed are quite large and, therefore, a thrust-bearing must be provided for absorbing great forces in a relatively small amount of space. It is known to provide several thrust-bearings in series on the shaft of an extruder with each bearing having a spring for the distribution of forces and each spring is supported one end against a casing and the other end against a pressure disc. However, this construction is disadvantageous in that the supports take up a great deal of outer space in an axial direction. There are also difficulties in preparing an installation since each bearing element must be built into the assembly and expertly adjusted.

The present invention will overcome the disadvantages and difficulties of the product art by providing a thrust-bearing with a number of individual bearing elements arranged in series with each bearing element or bearing unit including a reaction shaft and a collar thereon bearing against a pressure disc. A supporting antifriction bearing backed up by a spring of the conical washer type is enclosed in the housing of each bearing unit.

Further advantages and constructional features of the invention will be apparent from the following detailed description and the accompanying drawings illustrating the best mode contemplated of carrying out the principles of the invention.

Figure 2:
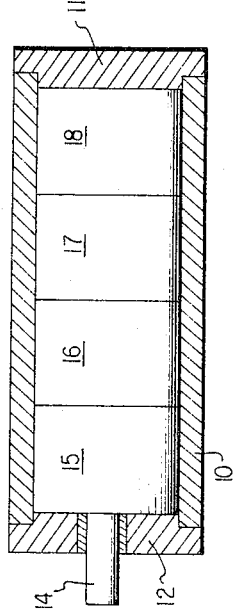
FIG. 2 is a top plan view of a thrust-bearing unit with one portion shown in transverse section.
Figure 4:
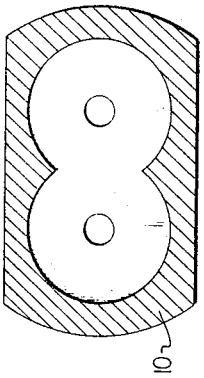
FIG. 4 is a longitudinal sectional view of the housing as shown in FIG. 3 with a number of thrust-bearing units therein in series relation.
Figure 1:
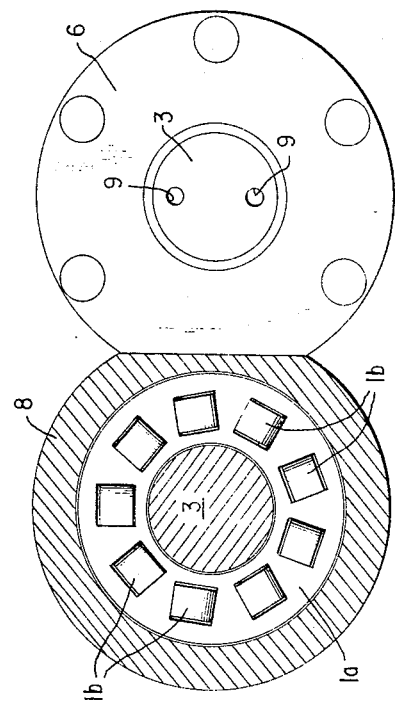
FIG. 1 is a longitudinal sectional view through a portion of a thrust-bearing unit in accordance with this invention.
Figure 3:
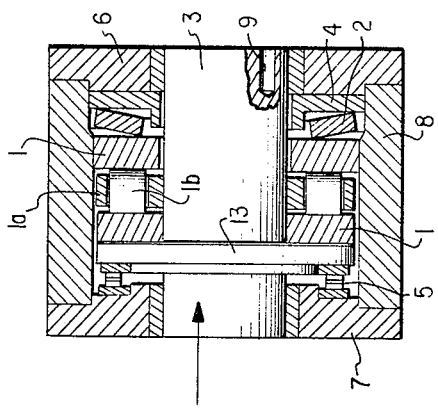
FIG. 3 is a transverse sectional view through a housing for containing a plurality of bearing units as shown in FIGS. 1 and 2.

As shown in FIG. 1, a bearing element or bearing unit includes a pair of pressure discs 1, which sandwich axially between them an antifriction bearing including thrust rollers 1b carried in bearing cage 1a. A spring 2 which is a conical washer type spring, as shown, surrounds shaft 3 and abuts against support disc 4 to absorb reaction forces in the direction of the arrows in FIG. 1. A bearing 5 is positioned, as shown in FIG. 1, and a bearing unit enclosure is provided by end covers 6 and 7 having axial openings therein and figure 8-shaped cover member 8. Shaft 3 includes axial bores 9 for receiving corresponding pins of the next adjacent bearing unit. The outer diameter of the enclosure including cover member 8 and end covers 6 and 7 is figure 8-shaped as shown in FIG. 2 so that these elements can be inserted into a casing 10 illustrated in FIGS. 3 and 4. The casing 10 may be closed by covers 11 and 12 to enclose a number of bearing units, such as units 15, 16, 17 and 18, of the type described in connection with FIGS. 1 and 2. A shaft 14 which may be the shaft of a parallel screw extruder directs reaction force to the right as viewed in FIG. 4 and the direction of the arrows in FIG. 1. The shaft includes collar 13, and it is noted that the length of the shaft of each bearing unit is the same as the length of the unit itself.

When the reaction force is applied in the direction of the arrow in FIG. 1 and shaft 3 is rotated by shaft 14 while being rotatably supported by the bearing 1b in cage 1a, sandwiched between pressure discs 1, 1, this provides the thrust-bearing while washer spring 2 provides a reaction force. Due to the fact that each shaft 3 of each bearing element 15, 16, 17 and 18 are abutting end to end, the reaction force will be applied equally to each bearing unit and the force will be uniformly distributed among and along the bearing units.

While the invention has been particularly shown and described with reference to preferred embodiments thereof, it will be understood by those skilled in the art that the foregoing and other changes in form and details may be made therein without departing from the spirit and scope of the invention.

What is claimed is:
A thrust-bearing comprising:
 (a) a hollow thrust-bearing casing,
 (b) a plurality of individual self contained thrust-bearing units positioned end to end in driving and abutting relationship within the casing,
 (c) the bearing units so positioned end to end in driving and abutting relationship providing uniform distribution of thrust among the several bearing units and each bearing unit comprising:
  (i) a thrust reacting stub shaft having a collar thereon,
  (ii) an enclosure having an outside surface configuration complementary to the inside of the casing surrounding the stub shaft, with the ends of the stub shaft extending to the ends of the enclosure,
  (iii) an antifriction thrust-bearing within the enclosure,
  (iv) a pair of annular pressure discs sandwiching the antifriction bearing, one of the pressure discs being between the shaft collar and the antifriction bearing,
  (v) an annular conically shaped washer type spring within the housing between the other pressure disc and one end of the enclosure.

References Cited by the Examiner
UNITED STATES PATENTS

| | | | |
|---|---|---|---|
| 1,539,750 | 5/1925 | Leon | 308—233 |
| 1,832,317 | 11/1931 | Lutz | 308—233 |
| 1,990,119 | 2/1935 | Ferguson | 308—233 |

DAVID J. WILLIAMOWSKY, *Primary Examiner.*
FRANK SUSKO, *Examiner.*